(12) United States Patent
Yi et al.

(10) Patent No.: US 9,705,774 B2
(45) Date of Patent: Jul. 11, 2017

(54) METHOD FOR CONTROLLING TRANSMISSION POWER AND TRANSMISSION DELAY, AND COMMUNICATION TERMINAL USING SAME

(71) Applicants: LG ELECTRONICS INC., Seoul (KR); Industry-Academic Cooperation Foundation, Yonsei University, Seoul (KR)

(72) Inventors: Yunjung Yi, Seoul (KR); Jeongho Kwak, Daejeon (KR); Okyoung Choi, Daejeon (KR); Song Chong, Seoul (KR); Byounghoon Kim, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 15/033,561

(22) PCT Filed: Oct. 29, 2014

(86) PCT No.: PCT/KR2014/010268
§ 371 (c)(1),
(2) Date: Apr. 29, 2016

(87) PCT Pub. No.: WO2015/065051
PCT Pub. Date: May 7, 2015

(65) Prior Publication Data
US 2016/0285727 A1    Sep. 29, 2016

Related U.S. Application Data

(60) Provisional application No. 61/897,191, filed on Oct. 29, 2013.

(51) Int. Cl.
*H04W 28/02* (2009.01)
*H04L 12/26* (2006.01)
(Continued)

(52) U.S. Cl.
CPC ......... *H04L 43/0888* (2013.01); *H04W 52/18* (2013.01); *H04W 52/288* (2013.01); *H04W 52/04* (2013.01)

(58) Field of Classification Search
CPC ..... H04W 28/10; H04W 48/18; H04W 52/04; H04W 52/343; H04W 52/18; H04W 88/02
See application file for complete search history.

(56) References Cited

U.S. PATENT DOCUMENTS

2006/0015636 A1\* 1/2006 Skraba ................... H04L 12/66
709/232
2012/0250571 A1\* 10/2012 Andrews ............... H04L 47/627
370/253
2013/0111241 A1\* 5/2013 Ha ..................... H04W 52/029
713/322

FOREIGN PATENT DOCUMENTS

KR          10-0382232 B1    5/2003
KR    10-2004-0093630 A    11/2004
(Continued)

OTHER PUBLICATIONS

PCT International Application No. PCT/KR2014/010268, International Search Report dated Jan. 26, 2015, 1 page.

*Primary Examiner* — Wesley Kim
*Assistant Examiner* — Dong-Chang Shiue
(74) *Attorney, Agent, or Firm* — Lee Hong Degerman Kang & Waimey (57) ABSTRACT

The present invention relates to a communication terminal and a control method thereof, and the communication terminal according to the present invention comprises: a radio
(Continued)

frequency (RF) unit for receiving and/or transmitting data; and a control unit for controlling the data received and/or transmitted through the RF unit, wherein the control unit can select an application processed through the terminal, control a processing speed of the terminal, determine the network through which the data is transmitted, and determine a combination of a data rate and transmission power.

11 Claims, 7 Drawing Sheets

(51) Int. Cl.
    *H04W 52/28*     (2009.01)
    *H04W 52/18*     (2009.01)
    *H04W 52/04*     (2009.01)

(56) References Cited

FOREIGN PATENT DOCUMENTS

| KR | 10-2013-0084660 A | 7/2013 | |
|----|-------------------|--------|----|
| WO | WO 2011100269 A1 * | 8/2011 | ......... H04L 12/5692 |
| WO | 2012-064067 A2 | 5/2012 | |

* cited by examiner

METHOD FOR CONTROLLING TRANSMISSION POWER AND TRANSMISSION DELAY, AND COMMUNICATION TERMINAL USING SAME

CROSS-REFERENCE TO RELATED APPLICATIONS

This application is the National Stage filing under 35 U.S.C. 371 of International Application No. PCT/KR2014/010268, filed on Oct. 29, 2014, which claims the benefit of U.S. Provisional Application No. 61/897,191, filed on Oct. 29, 2013, the contents of which are all hereby incorporated by reference herein in their entirety.

BACKGROUND OF THE INVENTION

Field of the Invention

The present invention relates to a method and apparatus for network communication, and more particularly, to a method of controlling power in a communication terminal, and an apparatus such as a terminal using the method.

Related Art

In a current communication environment in which a wired or wireless network is used, a terminal performs network selection or adaptive and modulation coding (AMC) or transmission power control by considering only a network environment.

In this case, the network selection, AMC, and transmission power control are independently performed by considering only the network environment.

Further, in the current communication method, all traffic is processed/transmitted with the fastest possible speed irrespective of delay tolerance of application traffic.

Unlike in the conventional method, if the network selection, the AMC, and the transmission power can be collectively controlled together with a central processing unit (CPU) speed by considering a power consumption model (a CPU and a network interface) of a smartphone, entire power consumption of the terminal can be minimized while ensuring throughput optimality.

SUMMARY OF THE INVENTION

The present invention provides a control method and apparatus for collectively controlling a central processing unit (CPU) speed, network selection, adaptive and modulation coding (AMC), and transmission power by considering a power consumption module (a CPU and a network interface) of a smartphone.

The present invention also provides a control method and apparatus for minimizing power consumption of a terminal while ensuring output optimality.

The present invention also provides a control method and apparatus for promoting output and power consumption optimality by considering a CPU of a terminal and a network state.

According to an aspect of the present invention, there is provided a method of controlling transmission power and transmission delay in a communication terminal. The method may include: selecting an application on the basis of a queue of the terminal and a network; controlling a CPU speed on the terminal as to the selected application; and determining a network set, data rate, and transmission power to be used in data transmission on the basis of the selected application and the controlled CPU speed.

According to another aspect of the present invention, there is provided a communication terminal for controlling transmission power and transmission delay. The communication terminal may include: a radio frequency (RF) unit for receiving and/or transmitting data; and a control unit for controlling the data to be received/transmitted via the RF unit, wherein the control unit selects an application processed in the terminal, controls a processing speed of the terminal, determines a network through which the data is transmitted, and determines a combination of a data rate and transmission power.

According to the present invention, a CPU speed, network selection, AMC, and transmission power can be collectively controlled by considering a power consumption module (a CPU and a network interface) of a smartphone.

According to the present invention, a communication terminal can be effectively operated by minimizing power consumption of a terminal while ensuring output optimality.

According to the present invention, output and power consumption optimality can be promoted by simultaneously considering a network state and a CPU of a terminal.

DESCRIPTION OF EXEMPLARY EMBODIMENTS

Conventionally, a communication terminal has performed network selection, adaptive and modulation coding (AMC), and transmission power control independently by considering only a network environment, and there has been a method of processing/transmitting all traffic as quickly as possible irrespective of a presence/absence of delay tolerance of application traffic.

However, instead of the conventional method in which a process related to each communication network is processed independently or delay tolerance of an application is ignored, there is a need to collectively control a central processing unit (CPU) speed, network selection, AMC, and transmission power by considering a power consumption model (a CPU and a network interface) of a smartphone.

In this case, a throughput can be optimized, and at the same time, entire power consumption of a terminal can be minimized.

According to the present invention, which network will be selected can be determined by considering power consumption of a terminal when an application insensitive to a delay, i.e., a delay tolerant application, is served to the terminal in a heterogeneous network environment in which cellular and WiFi networks co-exist.

When comparing a 3G network and a WiFi network, a network having good transmission efficiency may be selected on the basis of a fact that power used to transmit a unit bit is 3 or 4 times greater in the 3G network than in the WiFi network and a fact that the 3G network is always available but the WiFi network is available sporadically (WiFi hotspot) as well as by utilizing total size information of to-be-transmitted data currently remaining in the terminal.

For example, if the WiFi network cannot be used and there is only few data to be transmitted to the terminal (if not an urgent situation), instead of transmitting it as quickly as possible through the 3G network, transmission is delayed until a power efficient WiFi network is available, so as to serve a delay tolerant application with lower power even though there is a slight loss caused by the delay.

However, also in this case, if the total size of the data to be transmitted by the terminal is great (for example, if data is increased in size after a long delay in the terminal), the data may be transmitted through the 3G network.

If the network selection is controlled in this manner, the terminal can decrease power of the terminal to a great extent in trading off with a proper delay. However, up to now, a matter of the network selection has not been considered together with a heterogeneous network or has not been considered simultaneously with matters of the terminal.

The WiFi network (IEEE 802.11) may consider a relation of a data transmission rate (hereinafter, a data rate), transmission power, and a bit error rate to control a data rate (e.g., modulation and coding scheme (MCS)) and transmission power.

In general, when a target bit error rate is determined (e.g., a target bit error rate=0.01%), combinations of transmission power and a data rate corresponding to the target bit error rate may be determined. For example, a combination in which power is used to the minimum extent may be selected among several combinations of the data rate and the transmission power.

When the target bit error rate is determined, a detailed method of determining the combination of the data rate and the transmission power is as follows.

First, in a relation between a communication terminal and a WiFi access point (AP), the communication terminal transmits a packet to the WiFi AP with maximum transmission power and a minimum data rate. The WiFi AP transmits an ACK packet to the communication terminal with the maximum transmission power and the minimum data rate through a feedback for the packet received from the communication terminal. Upon receiving the ACK packet, the terminal may measure signal strength to determine transmission power according to each MCS level (or data rate). However, a different network environment (or heterogeneous network) and a terminal feature has not been considered together in the conventional method of selecting the combination of the data rate and the transmission power. In general, efficiency of the transmission power is in inverse proportion to the data rate according to Shannon capacity.

Meanwhile, it is known in general that CPU power of a smartphone is in proportion to a CPU clock speed in the range greater than or equal to the square of the CPU clock speed and less than or equal to the cube of the CPU clock speed. Therefore, if there is no problem in a load processed in the terminal, the lower the CPU clock speed, the higher the efficiency of the CPU power.

At present, a CPU chipset equipped in several smartphones has various clock control protocols. For example, in an Ondemand case, according to a load of the terminal, the clock speed is increased when the load is high, and the clock speed is decreased when the load is low. In a Conservative case, the clock speed is gradually decreased when the load of the terminal is changed from the high to the low. Further, in a Powersave case, it always operates with a minimum clock, and in a Performance case, it is always used with a maximum clock.

Recently, an LCD display uses maximum power when comparing a power consumption amount for each hardware module in a smartphone. However, since a power usage amount of the display is related to a user experience, except for this, a module which uses the second and third most power is a CPU and a cellular (3G) or WiFi network interface. A power usage amount of these second and third modules occupies more than 50% of the total power usage amount. Therefore, when CPU and network power is optimized simultaneously, it has a great effect on overall power saving of the smartphone.

Power consumption $P^C$ of the CPU of the smartphone is related to a CPU clock speed s, and may be expressed by a proportional expression such as $P^c(s)=\alpha s^3+\beta$. Therefore, as long as there is no problem in a CPU load processed in the terminal, a decrease in the CPU clock is helpful to power efficiency.

Further, consumption power of a network varies depending on which network will be selected or how to combine a data rate and transmission power of the determined network. The 3G network is always available, but power used to transmit one bit is greater in comparison with the WiFi network. Further, the WiFi network is sporadically available, but power used to transmit one bit is lower in comparison with the 3G network.

Therefore, even if only the 3G network is available, power efficiency can be increased in trading off with the delay if data is not directly transmitted through the 3G network but is transmitted when the WiFi network is available. Further, considering a combination of a data rate and transmission power which satisfies a specific bit error rate of the determined network, the higher the data rate, the greater the network power consumed in unit-bit transmission. In this case, therefore, if the network traffic is not great, the lower the data rate, the higher the power efficiency.

The decrease in the speed in the CPU and the network causes a further delay. Therefore, there is a tradeoff relation between the power efficiency and the traffic delay. Recently, there are many smartphone applications having a greater data size without being sensitive to a delay, such as a high definition movie download, a file backup, an update, or the like. Therefore, the application not sensitive to the delay may have higher power efficiency by allowing the delay.

Now, power consumption considering a network interface (3G, WiFi) and a CPU in a smartphone terminal is described.

Figure 1:
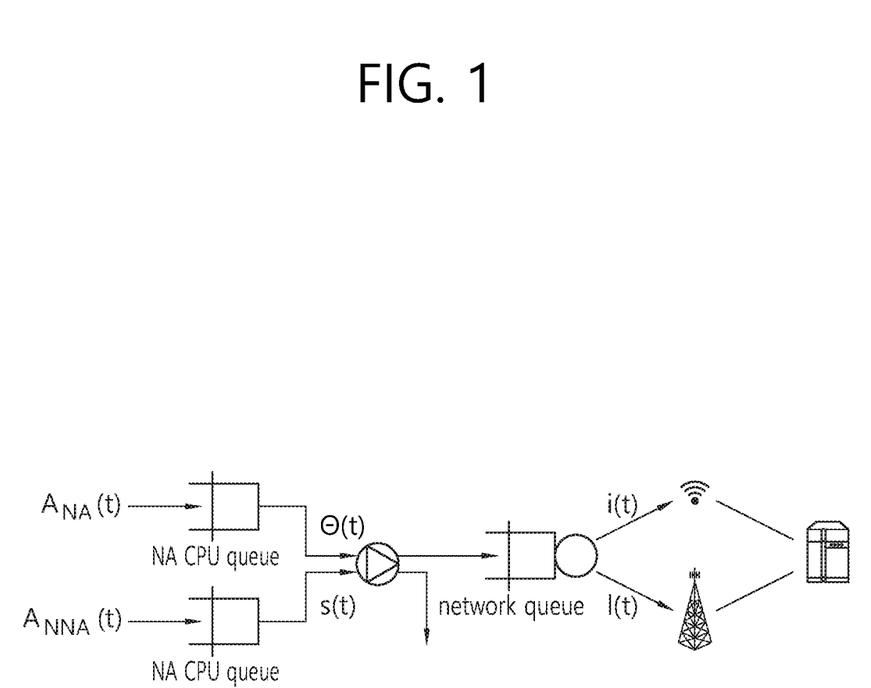
FIG. 1 is a view for briefly describing an example of a power control method of a terminal according to the present invention.

FIG. 1 is a view for briefly describing an example of a power control method of a terminal according to the present invention.

As shown in FIG. 1, each CPU and a network part are modeled with a queue. A delay tolerant networking application (NA) and a delay tolerant non-networking application (NNA) may be used for an input of a CPU queue. Referring to FIG. 1, data $A_{NA}$ for the NA application may be queued in an NA CPU queue, and data $A_{NNA}$ for the NAA application may be queued in an NNA CPU queue.

The NA may be an application which uses CPU and network resources simultaneously, such as Dropbox, application update, etc. Further, the NNA may be an application which does not use the network resource but uses only the CPU resource, such as video encoding, etc.

The NNA which uses only the CPU resource must be guaranteed its performance without having an effect on a network state unlike the NA which uses up to the network resource. However, it is extremely difficult to guarantee the performance without having an effect on the network state when using only one CPU queue. For example, if a network is a bottleneck point in a situation where NA traffic exists in a front side of the queue and NNA traffic exists in a rear side of the queue, performance of the NNA traffic in the rear side may be affected by a network environment.

Therefore, as a queue of the CPU part, two queues may be necessary according to an application type. By placing the two CPU queues, the proposed method can serve the NA without having an effect on performance of the NNA by the network environment.

Referring to FIG. 1, first, the CPU determines which application θ(t) will be processed in every time slot. θ(t) denotes an application to be processed at a time slot t.

According to the determined application, as shown in FIG. 1, at which speed a CPU clock s(t) will be set is determined. That is, a CPU speed is controlled according to the determined application. s(t) denotes the CPU speed (or the CPU clock) at time t.

The processed data enters a network queue. The network queue may determine which network I(t) will be selected. I(t) denotes a network selected at the time t. As a network that can be selected from the network queue, a 3G network may be selected, or a WiFi network or a 4G network may be selected, or all networks may be selected, or neither one of them may be selected. If a specific network is selected, a combination i(t) of transmission power and an AMC mode (data rate) may be determined. i(t) denotes a combination of the transmission power and the AMC mode determined at the time t.

In a communication terminal, according to I(t) and i(t), data may be transmitted in every time slot by that amount to a server through an uplink.

By using this control method, the present invention provides a method of commonly determining in every time slot the application selection θ(t) using minimum CPU and network power, the CPU clock speed control s(t), the network selection I(t), and the combinations i(t) of a data rate and transmission power of the selected network, while finitely maintaining an average CPU and network queue. In this case, the finitely maintaining of the network queue implies that data which enters the queue is processed to be served within a finite time.

Equation 1 shows an example of a method for determining an optimal CPU speed and transmission power according to the present invention.

$$\min_{(\theta(t),s(t),I(t),i(t))_{t=0}^{\infty}} \left( \bar{P} = \lim_{T\to\infty} \frac{1}{T} \sum_{t=0}^{T-1} (P^c(s(t)) + P^n(I(t), i(t), t)) \right)$$

$$\text{s.t. } \limsup_{t\to\infty} \frac{1}{t} \sum_{\tau=0}^{t-1} \mathbb{E}\{Q^c(t) + Q^n(t)\} < \infty$$

⟨Equation 1⟩ where $s(t) \in \{s_1, \ldots s_{max}\}$, $I(t) \in \{3G, WiFi, 3G+WiFi, NoTx\}$ In Equation 1, $P^c(s(t))$ denotes a CPU power consumption amount when using a CPU speed s(t), and $P^n(I(t),i(t),t)$ denotes a network power consumption amount at a time slot t when using the network set selection I(t) and the AMC and transmission power combination i(t).

Although it is exemplified in Equation 1 that a selectable network set includes four cases of 3G, WiFi, 3G and WiFi, and no data transmission, this is for exemplary purposes only. Thus, 4G, LTE, LTE-A, LTE-U, and a combination or the like including them may also be used as the selectable network set.

In the present invention, while processing/transmitting NA and NNA data in a smartphone within a specific time, an application for minimizing power consumption of a CPU and a network is selected, a CPU clock speed is controlled, a network is selected, and combinations of a data rate and transmission power of the selected network are determined. In this case, each selection and determination, that is, application selection, CPU clock speed control, network selection, and network transmission power and data rate combination determination, are commonly processed in every time slot.

1) In a network part, it may be considered that per-bit energy consumption is small in general when a Wi-Fi network is used in comparison with a cellular network. If the Wi-Fi network cannot be used, in a situation where a network queue and a CPU queue have no problem, transmission is achieved by waiting until a time at which the Wi-Fi network is available (that is, to have an opportunity capable of decreasing energy consumption even if a delay occurs), so that transmission through the Wi-Fi network can be selected as much as possible (if there is no problem in a delay or queue situation).

2) In addition thereto, when it is determined to use a specific network in general, it may be considered a fact that efficiency of energy consumed in a network interface is in inverse proportion to a data rate. In this case, network transmission power can be decreased if possible in a situation where there is no problem in the network queue and the CPU queue. For example, power efficiency can be increased by increasing network transmission power to transmit the network traffic quickly if network traffic is great, and by decreasing the network transmission power if the network traffic is small.

3) In addition, a traffic amount of the CPU queue may be considered. That is, if the CPU traffic is great, the CPU queue may be considered in network selection to decrease a delay and to quickly output the traffic. For example, if the CPU traffic is great, 3G transmission may be selected without having to wait for the WiFi network to decrease the delay.

4) A traffic amount of the network queue may be considered in a CPU part when a bottleneck occurs in a network. That is, if network traffic is great, a CPU speed may be decreased to save CPU power. On the contrary, if the bottleneck occurs in the CPU part in comparison with the network part, the CPU speed may be increased to properly adjust to a speed of the CPU part and the network part.

5) In order not to have an effect on performance of the NNA when the NA is served, if a bottleneck occurs in the network queue, the NNA is served, and if it is not the bottleneck occurring in the network queue (even if the bottleneck exists), the NA and the NNA may be equally served or an application having more traffic may be preferentially served.

6) CPU and network power can be collectively determined by four types of controls (application selection, CPU clock speed control, network selection, combination of a data rate and transmission power of the selected network) in the CPU and the network. For example, a tradeoff between total power and a total delay of an application can be controlled by adjusting one parameter V.

The method according to the present invention can also be understood as a method of solving an objective function and a constraint in a mathematical manner. For example, regarding the constraint, it may be considered a point in which traffic must be output to the maximum extent possible from a queue in every time slot in order to finitely maintain an average queue of the CPU and the network, and regarding the objective function, it may be considered a point in which a CPU speed and a network speed must be minimized in order to use average power of the CPU and the network to the minimum extent possible. The two points are contradicted each other, and thus a tradeoff between the two needs to be determined in the most efficient manner.

The present invention is applicable for several cases according to: (i) whether a network queue is a bottleneck point; and (ii) if the network queue is not the bottleneck point, which application between the NA and the NNA has much greater traffic. This is because, if the network queue is the bottleneck point, there is a need to serve the NNA always so as not to have an effect on performance of the NNA, and if the network queue is not the bottleneck point, there is a need to consider which application is more urgent.

Specifically, in summary, whether a condition 1 is satisfied is first determined.

Condition 1: Is an amount of data remaining in a network queue greater than a maximum transmissible data amount at a current time slot t? That is, is a condition of Equation 2 satisfied?

$$Q^n(t) > \mu_{max}(t) \left(\mu_{max}(t) = \max_{l(t),i(t)} \mu(l(t), i(t), t)\right)?$$ ⟨Equation 2⟩

Herein, $Q^n$ denotes data remaining in a network queue, and $\mu_{max}(t)$ denotes a maximum transmissible data amount for a network set I(t) and the AMC & power control combination i(t) at time i.

(1) If $Q^n(t) > \mu_{max}(t)$ in Equation 2, the case 1 is applied.

If the condition 1 is not satisfied, that is, if $Q^n(t) > \mu_{max}(t)$ is not satisfied, it is determined whether the condition 2 is satisfied. Condition 2: Is it $Q^n(t) \leq \mu_{max}(t)$, and is an NNA queue greater than a total NA queue (NA CPU queue+ network queue)? That is, is a condition of Equation 3 satisfied?

$$\frac{Q^c_{NA}(t) + Q^n(t)}{\gamma_{NA}} \geq \frac{Q^c_{NNA}(t)}{\gamma_{NNA}}?$$ ⟨Equation 3⟩

In Equation 3, $Q^c_{NA}(t)$ is a data amount of a CPU queue for an application NA, and $Q^c_{NNA}(t)$ is a data amount of a CPU queue for an application NNA. $\gamma_{NA}$ and $\gamma_{NNA}$ may be weights for the NA application and the NNA application, respectively.

(2) If the condition 2 is satisfied, that is, if $Q^n(t) \leq \mu_{max}(t)$ and if Equation 3 is satisfied, a case 2 is applied.

(3) If the condition 2 is not satisfied, that is, if $Q^n(t) \leq \mu_{max}(t)$ and if Equation 3 is not satisfied, a case 3 is applied.

A control method for the aforementioned three cases is as follows.

$$Q^n(t) > \mu_{max}(t) \quad \text{Case 1:}$$

Figure 2:
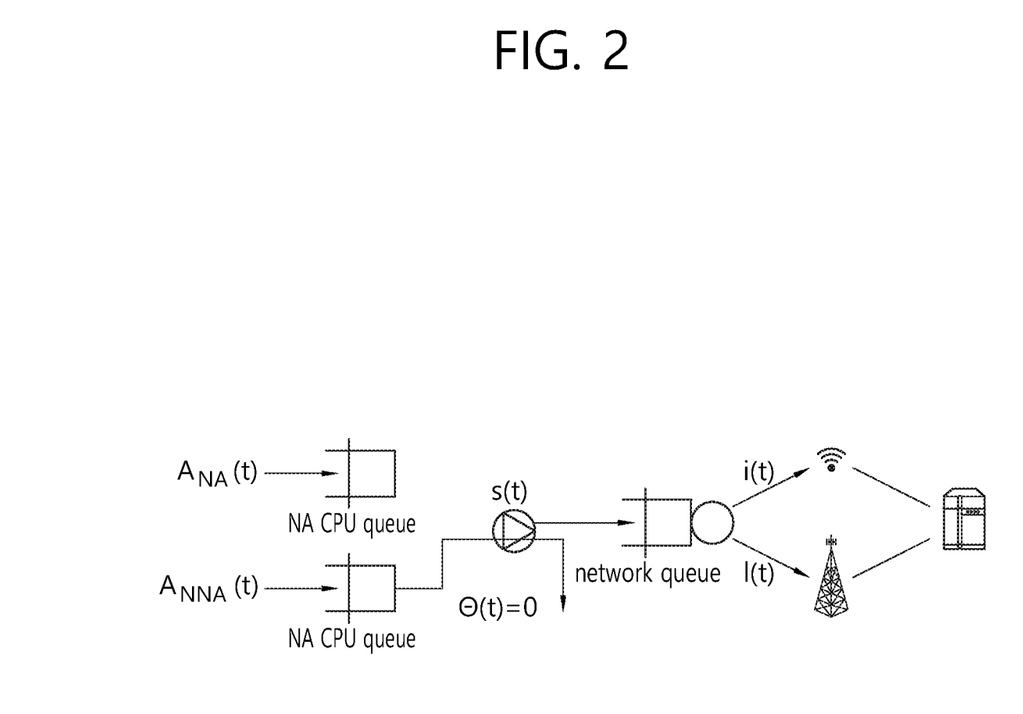
FIG. 2 is a view for briefly describing an example of a case 1 according to the present invention.

FIG. 2 is a view for briefly describing an example of the case 1 according to the present invention.

Application selection, CPU clock speed control, network set selection, and AMC & transmission power combination will be described in detail for the case 1 with reference to FIG. 2.

Application Selection

The case 1 is a case where a network side is a bottleneck point, and thus it is meaningless to send data from a CPU queue to a network queue by selecting an NA. Since it is more effective to select an NNA to decrease a total queue in a system, the NNA is selected in the case 1.

CPU Clock Speed Control

The CPU clock control is determined by Equation 4 below.

$$\min_{s(t)} \left\{ VP^c(s(t)) - \frac{s(t)}{\gamma_{NNA}} \times Q^c_{NNA}(t) \right\}$$ ⟨Equation 4⟩

Equation 4 has two separate terms. When a CPU clock speed is s(t) at time t, if CPU consumption power is $P^C$, a first term $VP^c(s(t))$ may be regarded as a term for decreasing CPU power. A second term $$\left( -\frac{s(t)}{\gamma_{NNA}} \times Q^c_{NNA}(t) \right)$$

of Equation 4 may be regarded as a term for decreasing a queue of the NNA, that is, a term for maintaining stability of the queue. Therefore, Equation 4 may be regarded as a method of deriving a parameter V for minimizing a difference between elements required to control the CPU queue of the NNA and transmission power in the CPU side.

In other words, in Equation 4, as an energy-delay tradeoff parameter, V is a parameter for adjusting a tradeoff between energy (power consumption) and a delay. V is a controllable parameter, and if V is great, a method in which an energy decrease is more weighted is applied, and if V is small, a method in which the delay is more weighted is applied.

Consequently, if a CPU queue of an NNA is great, it may operate at a high CPU speed (i.e., power saving may be traded off to some extent for reliability of the queue), and if the queue is small, it may operate at a low CPU speed (to save power).

Network Set Selection, AMC (Data Rate) & Transmission Power Control

The network set selection and the AMC & transmission power control may be determined by Equation 5.

$$\min_{l(t),i(t)} \{VP^n(l(t),i(t),t)) - \mu(l(t),i(t),t) \times (Q_{NA}^c(t)+Q^n(t))\}$$ ⟨Equation 5⟩

Equation 5 may have the same meaning as Equation 4 related to the CPU clock speed. That is, if network consumption power is $P^n$ when a CPU clock speed is s(t) at time t, a first term of Equation 5 may be regarded as a term for decreasing network power. A second term of Equation 5 may be regarded as a term for decreasing a queue of the NA, that is, a term for maintaining stability of the queue. That is, Equation 5 may be regarded as an equation for determining a parameter V for minimizing a difference between elements required to maintain a total queue for the NA and the network power.

In the case 1, a network side is a bottleneck point, and thus there are many cases where a total NA queue (NA CPU queue+network queue) is greater. Therefore, to solve the bottleneck problem, a network set I(t) and an AMC & transmission power combination i(t) may be selected by which a network speed can be increased.

Case 2:

$$Q^n(t) \le \mu_{max}(t) \,\&\, \frac{Q_{NA}^c(t) + Q^n(t)}{\gamma_{NA}} \ge \frac{Q_{NNA}^c(t)}{\gamma_{NNA}}$$

Figure 3:
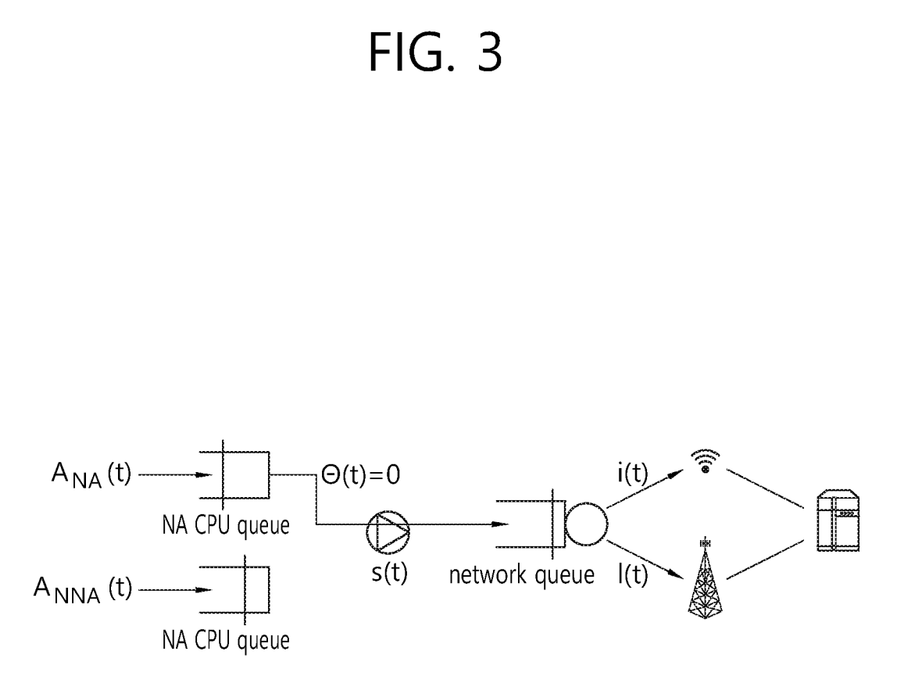
FIG. 3 is a view for briefly describing an example of a case 2 according to the present invention.

FIG. 3 is a view for briefly describing an example of the case 2 according to the present invention.

Application selection, CPU clock speed control, network set selection, and AMC & transmission power combination will be described in detail for the case 2 with reference to FIG. 3.

Application Selection

In the case 2, an NA and an NNA need to be treated equally since a CPU side is a bottleneck point in comparison with a network. Therefore, an application having a larger queue, that is, a more urgent application, must be selected by comparing a total NA queue including a network queue with an NNA queue. However, the NA is selected in the case 2 since the total NA queue is larger.

CPU Clock Speed Control

CPU clock speed control of the NA may be determined by Equation 6.

$$\min_{s(t)} \left\{ VP^c(s(t)) - \frac{s(t)}{\gamma_{NA}} \times (Q_{NA}^c(t) + Q^n(t)) \right\} \quad \langle \text{Equation 6} \rangle$$

That is, according to Equation 6, it operates at a high CPU speed if the total NA queue is large.

Network Set Selection and AMC & Transmission Power Control

The network set selection and the AMC & transmission power control may be determined by Equation 7.

$$\min_{l(t),i(t)} \{VP^n(l(t), i(t), t)) - \mu(l(t), i(t), t) \times (Q_{NA}^c(t) + Q^n(t))\} \quad \langle \text{Equation 7} \rangle$$

Condition:

$$\text{s.t.} \quad \mu(l(t), i(t), t) \le Q^n(t) + \frac{s(t)}{\gamma_{NA}}$$

Therefore, if the total NA is large, a network set and AMC & transmission power combination are selected by which a network speed is increased. However, in this case, it must be configured such that an output data amount is not greater than that of a current network queue.

Case 3:

$$Q^n(t) \le \mu_{max}(t) \,\&\, \frac{Q_{NA}^c(t) + Q^n(t)}{\gamma_{NA}} < \frac{Q_{NNA}^c(t)}{\gamma_{NNA}}$$

Figure 4:
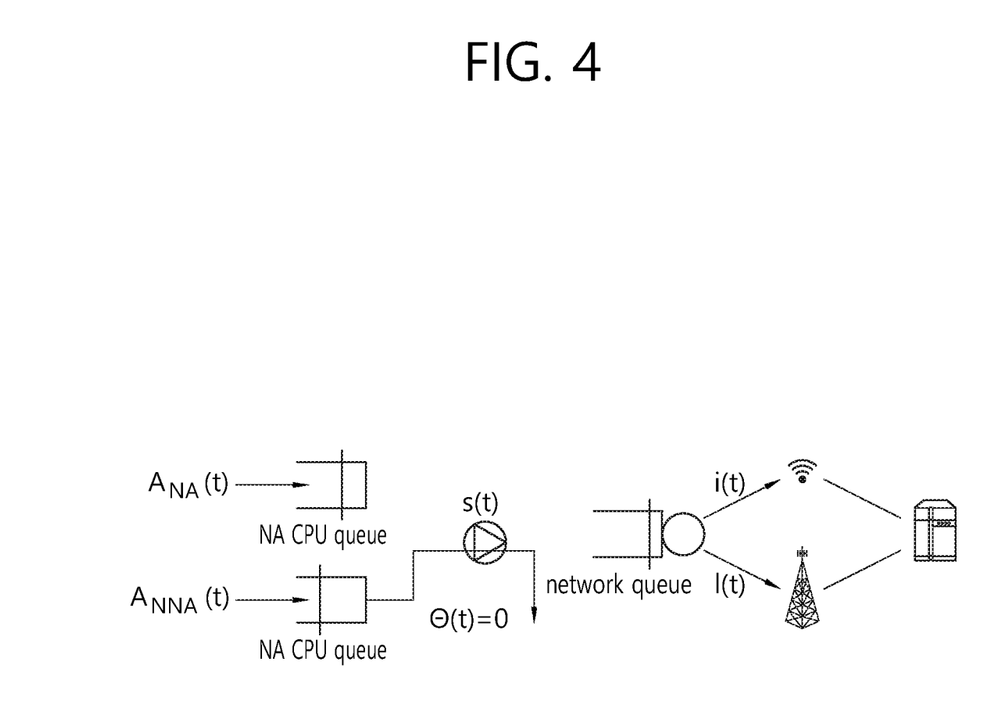
FIG. 4 is a view for briefly describing an example of a case 3 according to the present invention.

FIG. 4 is a view for briefly describing an example of the case 3 according to the present invention.

Application selection, CPU clock speed control, network set selection, and AMC & transmission power combination will be described in detail for the case 3 with reference to FIG. 4.

Application Selection

In the case 3, a CPU is a bottleneck point in comparison with a network. Therefore, an application having a larger queue (i.e., a more urgent application) may be selected by comparing an NNA queue with a total NA queue. Therefore, the NNA is selected in the case 3.

CPU Clock Speed Control

It may operate similarly to the case 1. That is, CPU clock control may be determined by Equation 4.

Consequently, if a CPU queue of an NNA is great, it may operate at a high CPU speed (i.e., power saving may be traded off to some extent for reliability of the queue), and if the queue is small, it may operate at a low CPU speed (to save power).

Network Set Selection and AMC & Transmission Power Control

The network set selection and the AMC & transmission power control may be determined by Equation 8.

$$\min_{l(t),i(t)} \{VP^n(l(t),i(t),t)) - \mu(l(t),i(t),t) \times (Q_{NA}^c(t) + Q^n(t))\}$$

Condition: s. t. $\mu(l(t),i(t),t) \le Q^n(t)$ <Equation 8>

In the case 3, if the total NA queue is small, a network set and an AMC & transmission power combination are selected by which power is less used, but an output data amount must be greater than that of a current network queue.

If the condition is $VP^n(l(t), i(t), t)) \le \mu(l(t), i(t), t) \times (Q_{NA}^c(t) + Q^n(t))$, $\forall(l(t), i(t))$, the network may not be selected, and no data may be transmitted.

<Selection of Energy-Delay Tradeoff Parameter V>

The energy-delay tradeoff parameter V may be selected by considering the following several environments.

First, if a time of residing in WiFi coverage can be predicted (e.g., staying in a place within the same WiFi coverage everyday for several hours), that time may be considered. In case of staying in the WiFi coverage for a long period of time, V may be set to be high to decrease power of a terminal to the maximum extent possible, and in the opposite case, V may be set to be low to prevent a transmission delay from being unnecessarily increased.

Second, a smartphone battery level may also be considered. If the battery level is high, V may be set to be low to decrease the transmission delay.

Third, a file size of an application may be considered. If the file size of the application is great, V is set to be low to prevent one file from being transmitted for an excessively long period of time. Whether the file size of the application is great or small may be determined by setting an average size of a normal file as a criterion.

As one embodiment for determining V, if a WiFi time usage rate is x %, a battery remaining amount is y %, an average file size to current file size ratio is k %, an average file size is z, and a current file size is zk/100, then V may be controlled by V' which is a value adjusted by Equation 9 below.

$$V' = V\left(\frac{50+x}{100}\right)\left(\frac{150-y}{100}\right)\left(\frac{200-z}{100}\right) \quad \langle \text{Equation 9} \rangle$$

In Equation 9, V may be determined by considering a transmission delay characteristic of the application, and V' may be dynamically adjusted by a WiFi time usage rate, a battery remaining amount, and an average file size.

However, Equation 9 is only one embodiment, and thus V' may be controlled in another manner by considering several environments in addition to the environment proposed herein.

Further, the WiFi time usage rate measured up to now by the terminal may be reported to an evolved NodeB (eNB), that is, a base station. The eNB may transmit an average of WiFi time usage rates of terminals of a specific region to a terminal which intends to newly enter the region, and thus may facilitate the newly entering terminal to more accurately determine V'. Further, information such as a data size or the like requested by the eNB to the terminal may also be transmitted from the eNB to the terminal to determine V'.

The control method described up to now may also be used in the eNB. The eNB is a terminal capable of wireless communication scheduling, and may also be called a base station (BS), a base transceiver system (BTS), a cell, a node, or the like.

Wi-Fi availability may be replaced with a probability that a terminal can enter a Wi-Fi range. In this case, it may be additionally considered that such a probability may differ for each terminal. In addition thereto, a delay tolerable by the terminal may also be reported to the eNB.

The eNB may determine the value V by considering a delay acceptable by the terminal, the WiFi availability, or the like. Further, the value V may be set differently for each terminal, and a control method may be performed differently for each terminal to consider terminals having such a different value.

Further, terminals having the same value V may be grouped to configure several queues, and then the aforementioned method may be performed in parallel.

When considering each terminal, how to share one network resource or queue must be considered, and for this, a method of allocating a resource assigned to each terminal may be considered. Alternatively, the eNB may set the value V in a cell-specific manner by considering all values V of the respective terminals. For example, the value V may be an average value or may be a weighted sum/average value. Alternatively, the aforementioned control method may be applied for each packer or data by applying the value V optimized to a transmission target of corresponding data.

At present, a CPU and network interfaces (WiFi, 3G) consume more than 50% of power in a smartphone. Therefore, the effective use of power of two types of modules may have a great effect on power management of the smartphone.

CPU power and WiFi, 3G network power can be saved significantly by applying the control structure of the present invention for simultaneously performing the CPU speed control, the network selection, and the AMC & transmission power control. In practice, as a result of a trace-based simulation, up to 45% power saving is possible in comparison with the conventional method.

In addition thereto, according to the present invention, in a smartphone environment in which an application which does not use a network is performed simultaneously, CPU and network power can be effectively saved without having an effect on performance of the application which does not use the network.

Further, similarly to LTE or LTE-A, according to the present invention, power saving can be gradually increased when using many power efficient networks (a network having low power in unit data transmission). In practice, a simulation result shows that a power saving gain can be increased to up to 75% according to the proposed method in comparison with the conventional power consumption when a temporal WiFi coverage is extended.

Figure 5:
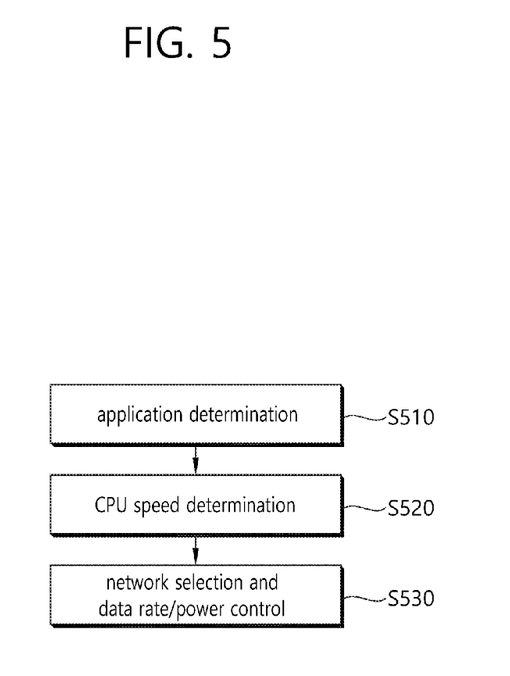
FIG. 5 is a flowchart for briefly describing an example of a control operation performed by a communication terminal such as a smartphone according to the present invention.

FIG. 5 is a flowchart for briefly describing an example of a control operation performed by a communication terminal such as a smartphone according to the present invention. For convenience of explanation, it is described in the example of FIG. 5 that a controller in the communication terminal performs the control operation. However, each control operation may also be performed in a separate unit.

Referring to FIG. 5, first, the controller selects an application (S510). The controller may select any one of an application which uses a network and an application which does not use the network by considering a queue state, a network state, a CPU speed, or the like. A detailed description regarding the application selection is the same as described above.

The controller may determine the CPU speed to be applied to the selected application (S520). The control of the CPU speed may be performed by considering the network state, the queue state, or the like. A method of controlling a CPU clock speed is the same as described above in detail.

The controller may perform network selection and data rate/power control (S530). The controller may select an optimal network through a tradeoff between factors to be considered such as power, a data processing speed, or the like, and also may determine a combination between the most effective transmission power (consumption power) and data rate. The content related thereto is the same as described above.

Although the application selection, the CPU speed control, the network selection, the data rate and power combination determination are described in that order in the example of FIG. 5, the present invention is not limited thereto. For example, a combination of a data rate and power is determined and then a network may be determined on the basis thereof, and a condition for optimizing: ① the application selection; ② the CPU speed control; ③ the network selection; and ④ the data rate and power combination determination may be found to concurrently derive results required in ① to ④.

Meanwhile, the controller may perform a necessary control by considering both of a terminal-side state and a network-side state. That is, the CPU speed, the CPU queue, the network queue, the CPU consumption power, network consumption power, or the like may be considered together to derive the decision required in ① to ④. Details related thereto are the same as described above.

Figure 6:
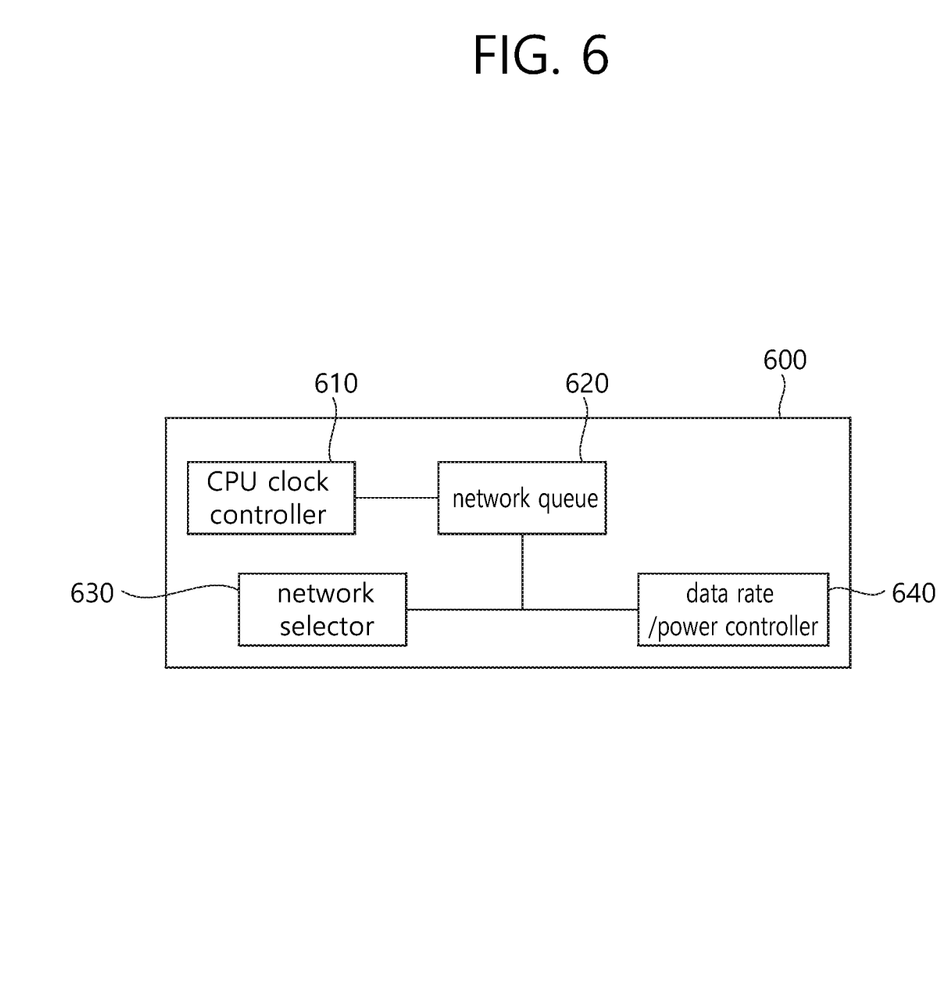
FIG. 6 is a block diagram for briefly describing an example of a structure of a communication terminal for performing a control operation according to the present invention.

FIG. 6 is a block diagram for briefly describing an example of a structure of a communication terminal for performing a control operation according to the present invention. For convenience of explanation, a structure of a controller 600 of the communication terminal for performing the control operation is first described in the example of FIG. 6.

Referring to FIG. 6, the controller 600 may include a CPU clock controller 610, a network queue 620, a network selector 630, and a data rate/power controller 640.

The CPU clock controller 610 controls a CPU speed. A method of controlling the CPU speed is the same as described above. The network queue 620 controls queuing of a network. The network selector 630 may select the network to which data will be transmitted on the basis of a result derived in a control process. A specific method of selecting the network is the same as described above. The data rate/power controller 640 may determine a combination of a data rate and power. A specific method of determining this combination is the same as described above.

Although it is described in the example of FIG. 6 that the controller 600 includes the CPU clock controller 610, the network queue 620, the network selector 630, and the data rate/power controller 640, the network queue 620 may be excluded from the controller as a separate component.

Further, although not shown, the controller 600 may include a CPU queue. The CPU queue may be included in the controller 600 or may exist in a communication terminal other than the controller 600 or may be constructed of a separate queue for an NA and an NNA, and may perform an operation regarding which application will be selected.

For example, the controller 600 may compare a data amount in the CPU queue to select any one of the NA and the NNA.

Figure 7:
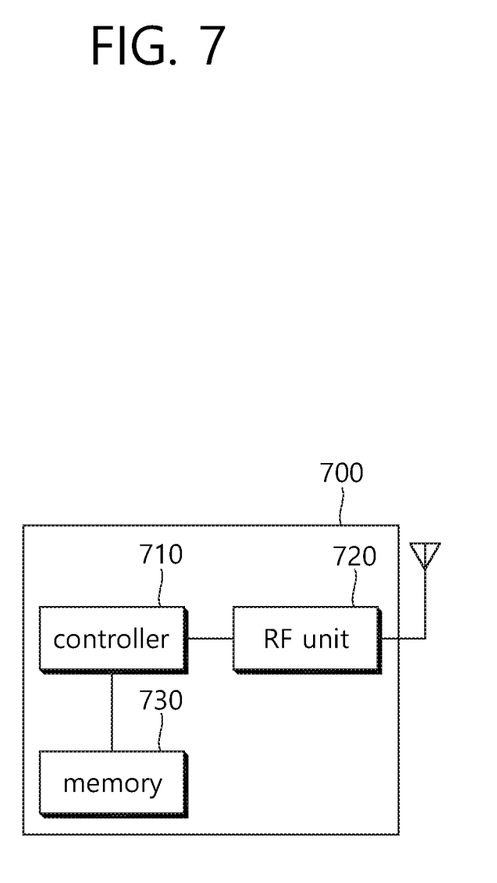
FIG. 7 is a block diagram for briefly describing an example of a structure of a communication terminal according to the present invention.

FIG. 7 is a block diagram for briefly describing an example of a structure of a communication terminal according to the present invention. Referring to FIG. 7, a communication terminal 700 may include a controller 710, an RF unit 720, and a memory 730. The controller 710 may perform each operation of the controller of FIG. 6. The RF unit 720 may perform data transmission and reception on the basis of parameters (e.g., a network set, transmission power, etc.) determined by the controller 710.

The memory 720 may store data required in the operation of the controller 710 in addition to a CPU queue and a network queue.

As described with reference to FIG. 6, any one of the CPU queue and the network queue may belong to the controller 710.

Although methods of the aforementioned exemplary embodiments have been described on the basis of a flowchart in which steps or blocks are listed in sequence, the steps of the present invention are not limited to a certain order. Therefore, a certain step may be performed in a different step or in a different order or concurrently with respect to that described above. In addition, the aforementioned exemplary embodiments include various aspects of examples. For example, the aforementioned embodiments may be performed in combination, and this is also included in the embodiments of the present invention. All replacements, modifications and changes should fall within the spirit and scope of the claims of the present invention.

What is claimed is:

1. A method for controlling an uplink transmission of a terminal including a first central processing unit (CPU) buffer, a second CPU buffer and a network buffer which is related to a cellular interface and a wireless local area network (WLAN) interface, the method comprising:
   selecting, by the terminal, application traffic to be processed between Network Application (NA) traffic which is buffered in the first CPU buffer and Non-Network Application (NNA) traffic which is buffered in the second CPU buffer based on an amount of network traffic in the network buffer and an amount of a transmissible traffic of the terminal;
   controlling, by the terminal, a central processing unit (CPU) speed based on the application traffic and processing the application traffic at the CPU speed;
   maintaining, by the terminal, the processed application traffic as the network traffic in the network buffer;
   determining, by the terminal, a network interface between the cellular interface and the WLAN interface for the uplink transmission based on the CPU speed, an amount of the NA traffic in the first CPU buffer and the amount of the network traffic in the network buffer;
   controlling, by the terminal, a data rate and transmission power for the uplink transmission based on the CPU speed, the amount of the NA traffic in the first CPU buffer, and the amount of the network traffic in the network buffer; and
   transmitting, by the terminal, the network traffic based on the data transmission rate and the transmission power through the network interface.

2. The method of claim 1, wherein in the selecting of the application traffic, the NA traffic which uses network resources and CPU resources is selected if the amount of the transmissible traffic exceeds the amount of the network traffic.

3. The method of claim 1, wherein in the selecting of the application traffic, the NNA traffic which uses only CPU resources is selected if the amount of the network traffic exceeds the amount of the transmissible traffic.

4. The method of claim 1, wherein in the controlling of the CPU speed, the CPU speed of the terminal is decreased if the amount of the network traffic exceeds the amount of the transmissible traffic.

5. The method of claim 1, wherein in the controlling of the processing speed, the processing speed of the terminal is increased if the amount of the transmissible traffic exceeds the amount of the network traffic.

6. The method of claim 1, wherein the amount of the transmissible traffic is determined based on the network interface, the data rate and the transmission power.

7. A terminal for controlling an uplink transmission of a terminal including a first central processing unit (CPU) buffer, a second CPU buffer and a network buffer which is related to a cellular interface and a wireless local area network (WLAN) interface, the terminal comprising:
   a radio frequency (RF) unit for receiving and/or transmitting data; and a control unit for controlling the data to be received/transmitted via the RF unit,
   wherein the control unit selects application traffic to be processed between Network Application (NA) traffic which is buffered in the first CPU buffer and Non-Network Application (NNA) traffic which is buffered in the second CPU buffer based on an amount of network traffic in the network buffer and an amount of a transmissible traffic of the terminal, controls a central processing unit (CPU) speed based on the application traffic and processing the application traffic at the CPU speed, maintains the processed application traffic as the network traffic in the network buffer, determines a network interface between the cellular interface and the WLAN interface for the uplink transmission based on the CPU speed, an amount of the NA traffic in the first CPU buffer and the amount of the network traffic in the network buffer, controls a data rate and transmission power for the uplink transmission based on the CPU speed, the amount of the NA traffic in the first CPU buffer, and the amount of the network traffic in the network buffer; and transmits the network traffic based on the data transmission rate and the transmission power through the network interface.

8. The terminal of claim 7, wherein the control unit selects the NA traffic which uses network resources and CPU resources if the amount of the transmissible traffic exceeds the amount of the network traffic.

9. The terminal of claim 7, wherein the control unit selects the NNA traffic which uses only CPU resources is selected if the amount of the network traffic exceeds the amount of the transmissible traffic.

10. The terminal of claim 7, wherein the control unit the CPU speed of the terminal if the amount of the network traffic exceeds the amount of the transmissible traffic.

11. The terminal of claim 7, wherein the control unit increases the CPU speed of the terminal if the amount of the transmissible traffic of the terminal exceeds the amount of the network traffic.

\* \* \* \* \*